June 3, 1958    L. E. MAJERONI ET AL    2,837,388
STACKING LAP TRAY FOR FOOD
Filed July 30, 1956
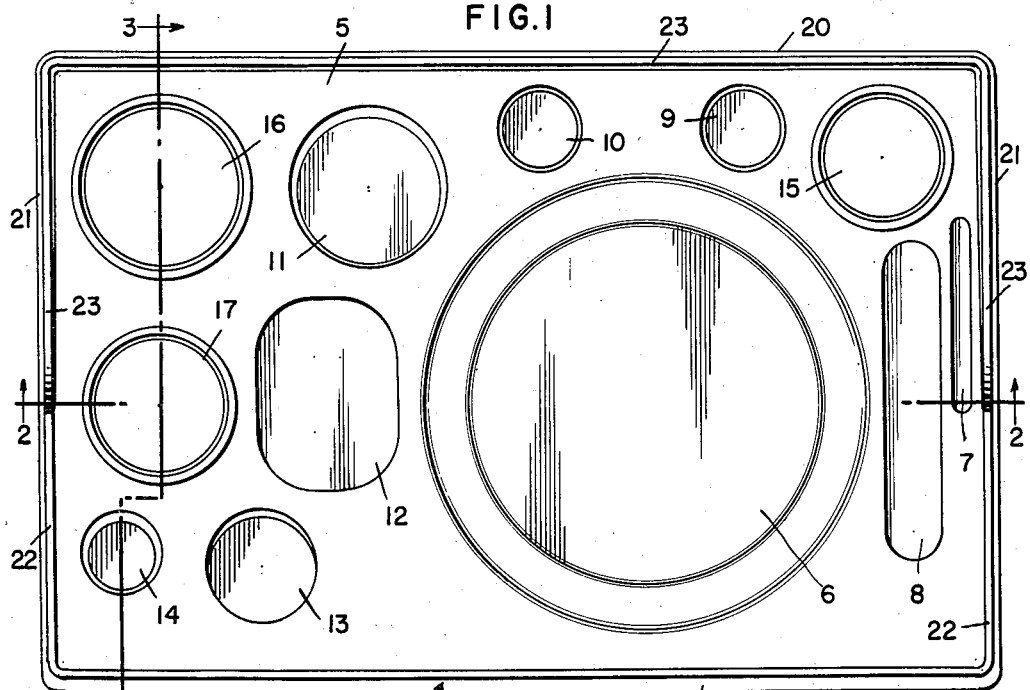
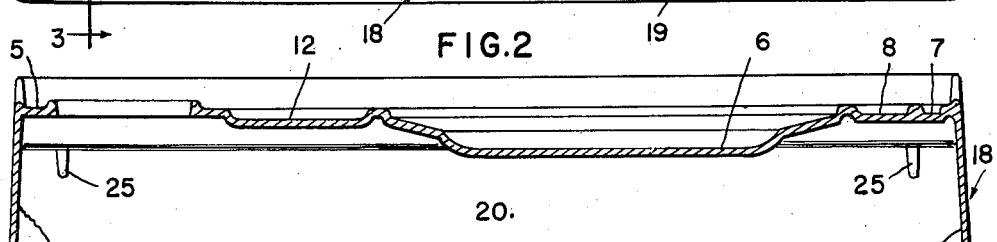
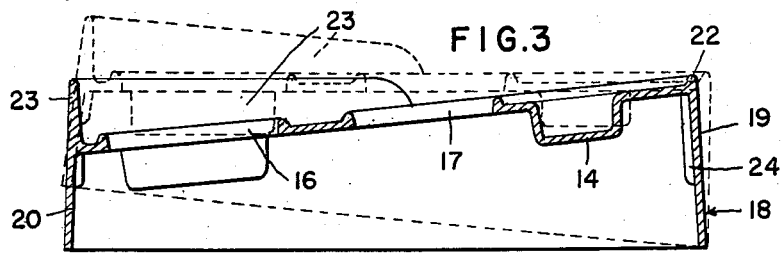
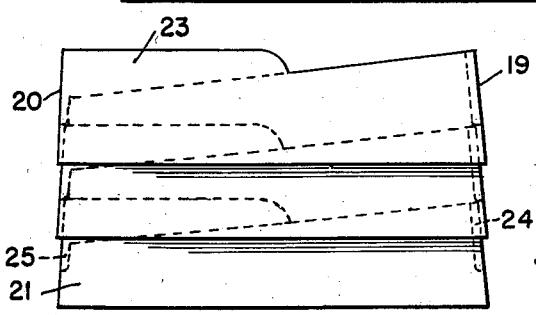
INVENTORS
Lamar E. Majeroni
Edward E. Majeroni
BY

United States Patent Office 2,837,388
Patented June 3, 1958

2,837,388

STACKING LAP TRAY FOR FOOD

Lamar E. Majeroni and Edward E. Majeroni, Erie, Pa.

Application July 30, 1956, Serial No. 600,986

7 Claims. (Cl. 311—23)

This invention relates to a food tray, the table portion of which is provided with depressions for the reception of a variety of food receptacles holding a complete meal.

It has been found that conventional type food trays, while satisfactory for most purposes, are unsatisfactory for use at drive-in restaurants, or like establishments offering car service, where the tray is held on the customer's lap. The structural design of automobile seats is such that, the tray-supporting portion of the leg is inclined upwardly away from the torso with the result that there is likelihood of spilling food from conventional trays onto the lap. It is an object of the present invention, therefore, to provide a food tray adapted to hold a complete meal and designed to compensate for the inclination of the tray-supporting part of the legs, in order that the table portion of the tray may be disposed in a horizontal plane.

Another object is to provide a food tray comprising a one piece body having a table portion with recesses and openings formed therein, for the reception of variously shaped receptacles holding food and liquids, the table portion being supported by a wall pending therefrom, opposed sides of which taper fore and aft to dispose the table portion to a horizontal plane, when the tray is rested on the legs, the tray being further provided with an abutment flange extending upwardly from the table portion to intercept spilled liquid or food.

A further object is to provide a food tray of the character described, adapted for nesting with a subjacent tray, and having stops pending from the underside of the table portion for limiting the movement of the subjacent tray to prevent wedging, and to permit nesting of a plurality of the trays in vertical alignment.

Other objects of the invention will be manifest from the following description of the present preferred embodiment of the invention taken in connection with the accompanying drawings, wherein:

Fig. 1 is a top plan view of a food tray constructed in accordance with the present invention;

Fig. 2 is a sectional view taken along the lines 2—2 of Fig. 1, looking in the direction of the arrows;

Fig. 3 is a sectional view taken along the lines 3—3 of Fig. 1, looking in the direction of the arrows and showing in dotted lines the position of the tray when in use; and Fig. 4 is a side elevational view of a plurality of food trays constructed in accordance with the present invention, the trays being shown in nested position.

Referring now in greater detail to the drawings, the tray of the present invention is preferably of one-piece plastic construction and comprises a table portion 5 adapted to receive a plurality of food receptacles which, if desired, may be of the disposable type. The forepart of the table portion 5 is provided with a circular recess 6, which complements the shape of, and is adapted to receive, a conventionally shaped plate holding the main course of the meal (see Fig. 2). Recess 6 prevents casual displacement of the plate and the bottom provides a firm substantial base to facilitate cutting of meat or other food on the plate. Besides recess 6, table portion 5 is provided with a plurality of smaller recesses of various sizes and shapes designated 7, 8, 9, 10, 11, 12, 13 and 14 for the reception of auxiliary food receptacles and silverware. All the recesses are formed integrally with table portion 5.

In addition to the aforementioned recesses, table portion 5 is further provided with a plurality of circular openings 15, 16 and 17 adapted to receive paper cups or glasses holding liquids, the diameter of the openings being such that the lower portion of the cups or glasses extends into the openings to a point below the plane of table portion 5.

As shown to advantage in Figs. 2 and 3, table portion 5 is supported by a wall designated 18 pending downwardly therefrom and formed integrally with the table portion. Wall 18 comprises a front section 19, a rear section 20 and like side sections 21, all of which are spread outwardly a slight distance beyond the margins of table portion 5 to permit nesting of a plurality of trays.

In order that table portion 5 may lie in a horizontal plane when the tray is held on the lap, the lower margin of each side section 20 tapers fore and aft in order to compensate for the inclination of the tray-supporting part of the legs, the front section 19 being the higher.

The upper terminal of front section 19 is extended slightly above the plane of table portion 5 to provide a flange or rim 22 for intercepting spilled food or liquid to prevent the same from dropping to the lap. Flange 22 is extended above side sections 21 to a point intermediate their length where it issues into a higher flange 23 extending the remainder of the side sections and above rear section 20. From a consideration of Fig. 3, it is clear that the combined height of rear section 20 and flange 23 equals the combined height of front section 19 and flange so that, when the trays are nested, the upper margin of flange 23 is uniplanar with the upper margins of flange 22. This plane is, in turn, parallel to the plane in which the lower margin of supporting wall 18 lies.

It is also within the contemplation of the present invention to provide means for nesting a plurality of the trays in vertical alignment without adjacent trays becoming wedged together. For this purpose, a pair of spaced finger-shaped stops 24 depend from table portion 5 at its point of juncture with front section 19, and a second pair of finger-shaped stops 25 pend from table portion 5 at its point of juncture with rear section 20. Fingers 24 and 25 engage the upper margins of flanges 22 and 23 of a subjacent tray when the trays are nested. (See Fig. 4). Stops 24 and 25 are of predetermined, different lengths so that the lower terminals thereof lie in a plane parallel to that of the upper margin of flanges 22 and 23 and the lower margin of wall 18.

In Fig. 3, the position of the tray when resting on the lap is shown in dotted lines. In this position, the table portion 5 is disposed horizontally, the tapered side sections and resultant difference in height compensating for the inclination of the tray supporting portion of the legs. In the nested position shown in full lines in Fig. 3 and in Fig. 4, the upper terminals of flanges 22 and 23 and the lower extremity of wall 18 lie in horizontal planes and table portion 5 is slanted. Also, the lower terminals of stops 24 and 25 lie in a horizontal plane and are adapted to engage the upper terminals of flanges 22 and 23 of a nested subjacent tray. Consequently, a plurality of trays may be nested in vertical alignment without danger of wedging of adjacent trays.

While we have herein shown and described a preferred embodiment of our invention, it is nevertheless to be understood that various changes may be made therein, without departing from the spirit and scope of the claims hereto appended.

What we claim is:

1. A food tray comprising a one piece body including a table portion with depressions for the reception of receptacles in which food is served, and a supporting wall pending from the table portion, the lower margin of which tapers fore and aft to hold the food receptacles level while the tray is supported on the lap of the user.

2. The food tray of claim 1 in which an abutment flange extends upward from the table portion to intercept spilled liquid or food.

3. A food tray comprising a one piece body including a table portion for the reception of receptacles in which food is served, a supporting wall pending from the table portion, the lower margin of which wall tapers fore and aft to hold the food receptacles level when the tray is supported on the lap of the user, and stops pending from the table portion of the tray for limiting entry of a stacked subjacent tray.

4. A food tray comprising a one piece body including a table portion for the reception of receptacles in which food is served, a supporting wall pending from the table portion, said wall being spread outwardly beyond the margins of said table portion to permit nesting of the tray with a subjacent tray, and stop means pending from said table portion for limiting the entry within the wall of a stacked subjacent tray.

5. A food tray as set out in claim 3 in which the stops and upper terminal of the tray lie in horizontal planes when stacked.

6. A food tray comprising a body including a table portion adapted for the reception of food, and a supporting wall pending from, and spread outwardly beyond, the margins of said table portion to permit stacking of the tray on a subjacent tray, the lower margin of said wall tapering fore and aft to hold the table portion level when the tray is supported on the lap of the user.

7. A food tray as set out in claim 6 with the addition of stops extending downwardly from the table portion within the supporting wall at the fore and aft ends of the tray, the lower terminals of the stops lying in a plane parallel to the plane of the upper extremity of the tray.

References Cited in the file of this patent

UNITED STATES PATENTS

| | | |
|---|---|---|
| 2,315,608 | Fergusson | Apr. 6, 1943 |
| 2,430,049 | Flory | Nov. 4, 1947 |
| 2,444,584 | Touchett | July 6, 1948 |
| 2,540,849 | Walker | Feb. 6, 1951 |
| 2,640,747 | Bodenhoff | June 2, 1953 |
| 2,651,926 | Enslein | Sept. 15, 1953 |
| 2,680,523 | Heeter | June 8, 1954 |
| 2,709,119 | Champman | May 24, 1955 |
| 2,723,037 | Matesie | Nov. 8, 1955 |